United States Patent [19]
Ishikawa

[11] Patent Number: 5,853,832
[45] Date of Patent: Dec. 29, 1998

[54] OIL APPLICATION ROLL FOR ELECTROPHOTOGRAPH FIXATION AND METHOD OF FABRICATING THE SAME

[75] Inventor: Youichi Ishikawa, Tokyo, Japan

[73] Assignee: Nitto Kogyo Co., Ltd., Tokyo, Japan

[21] Appl. No.: 774,817

[22] Filed: Dec. 27, 1996

[30] Foreign Application Priority Data

Dec. 28, 1995 [JP] Japan .................................. 7-342452

[51] Int. Cl.$^6$ .................................................. G03G 15/20
[52] U.S. Cl. ..................... 428/36.2; 428/321.1; 399/324; 399/325; 430/124; 492/53
[58] Field of Search ................. 428/36.2, 321.1; 399/324, 325; 430/124; 492/53

[56] References Cited

U.S. PATENT DOCUMENTS 5,045,889  9/1991  Hoover ..................................... 355/284

FOREIGN PATENT DOCUMENTS 4-139477  5/1992  Japan .
5-33650   5/1993  Japan .

*Primary Examiner*—Mark Chapman
*Attorney, Agent, or Firm*—McDermott, Will & Emery

[57] ABSTRACT

Disclosed herein is an oil application roll for electrophotograph fixation, which comprises a roll base, an oil holder provided on the roll base, and a porous fluororesin surface layer provided on the oil holder. The porous fluororesin surface layer has a maximum pore diameter of less than 0.1 $\mu$m, an air permeability of 500 to 6000 s/100 cc, and a surface roughness of less than Ra 0.5 $\mu$m. There is also provided a method of fabricating an oil application roll for electrophotograph fixation, which comprises the steps of (a) providing an oil holder on a roll base, (b) mounting a cylindrical film consisting of porous fluororesin having a thermal shrinkage of more than 30% onto the oil holder to obtain a roll body, and (c) heating the roll body so that the oil holder is covered with the cylindrical film. The cylindrical film consisting of porous fluororesin has a maximum pore diameter of less than 0.1 $\mu$m, a void ratio of between 25% and 70%, an air permeability of between 500 s/100 cc and 4000 s/100 cc, and a surface roughness of less than Ra 0.5 $\mu$m.

6 Claims, 1 Drawing Sheet

OIL APPLICATION ROLL FOR ELECTROPHOTOGRAPH FIXATION AND METHOD OF FABRICATING THE SAME

FIELD OF THE INVENTION

The present invention, in an electrophotograph fixation device using a fixing roll and a fixing belt, relates to an oil application roll for applying a parting oil to the surface of the fixing roll and a method of fabricating such an oil application roll.

DESCRIPTION OF THE PRIOR ART

There have been extensively used dry thermal fixation devices where an unfixed powder toner image obtained by electrophotography is heated and pressurized between a heated fixing roll and a pressure applying roll in order to fix the image onto a recording medium such as paper. In a fixation device such as this, a parting oil such as silicon oil is applied to the surface of the fixing roll during operation of the fixation device by using, for example, an oil application roll in order to prevent an occurrence of an offset phenomenon which is caused by residual toner adhering to the surface of the fixing roll and to alleviate the wear on the fixing roll which is caused by a separation claw for separating a recording medium therefrom.

As an oil application roll such as this, there is an oil application roll for a mass of processes, where an oil impregnated surface layer is provided on the periphery of a roll base formed with a metal pipe and a parting oil filled in the interior of the roll base is applied little by little to the roll surface. Since there are many cases where a relatively small image processing quantity is required, there has recently been utilized a simple oil application roll where a roll with a thick oil impregnatable layer is impregnated with a parting oil beforehand and which is used until the parting oil is consumed and then is thrown away.

However, in the conventional simple oil application roll, the oil application quantity is not always easy to control in a suitable range because the toner molten on the surface adheres. To enhance the parting property of the surface of the oil application roll and control the oil application quantity, there has been proposed an oil application member where an oil-transmission control layer consisting of porous polytetrafluoroethylene has been provided on the surface of a thick porous fabric member impregnated with oil (Japanese Patent Application Laid-Open No. HEI 4-139477). Such an oil application roll is fabricated by a method of winding a porous polytetrafluoroethylene film, gravure-coated with a thermosetting adhesive, on the surface of a porous melamine resin body and then fusing them together.

However, in the oil application roll having a porous polytetrafluoroethylene surface layer such as described above, distribution of an oil application quantity is not uniform and toner blinding will easily come to occur, because a polytetraethylene film has been fused on the surface of a melamine resin body by using a thermosetting adhesive. Therefore, adhesion of fused toner to the roll surface cannot be completely prevented and the toner coagulated on the oil application oil is transferred onto the fixing roll surface again, so there is the drawback that image fouling takes place or the copied image becomes stained or dark.

SUMMARY OF THE INVENTION

The objective of the present invention is to provide an oil application roll which is capable of improving image antifouling performance, while overcoming the disadvantages of an oil application roll having a porous polytetrafluoroethylene surface layer, i.e., a fluctuation in the oil application quantity and a reduction in the oil application quantity which is caused by toner blinding during use.

The foregoing objective is accomplished by providing an oil application roll for electrophotograph fixation, which comprises a roll base, an oil holder provided on the roll base, and a porous fluororesin surface layer provided on the oil holder. The porous fluororesin surface layer has a maximum pore diameter of 0.1 μm or less, an air permeability of 500 to 6000 s/100 cc, and a surface roughness of Ra 0.5 μm or less.

It is preferable that the porous fluororesin surface layer be composed of polytetrafluoroethylene. It is also preferable that the porous fluororesin surface layer has a thickness of 0.05 mm or more.

The foregoing objective is also accomplished by providing a method of fabricating an oil application roll for electrophotograph fixation, which comprises the steps of (a) providing an oil holder on a roll base, (b) mounting a cylindrical film consisting of porous fluororesin having a thermal shrinkage of 30% or more onto the oil holder to obtain a roll body, and (c) heating the roll body so that the oil holder is covered with the cylindrical film. The cylindrical film consisting of porous fluororesin has a maximum pore diameter of 0.1 μm or less, a void ratio of between 25% and 70%, an air permeability of between 500 s/100 cc and 4000 s/100 cc, and a surface roughness of Ra 0.5 μm or less.

When an oil holder is provided on a roll base and then a cylindrical film consisting of porous fluororesin is mounted closely on the oil holder, there can be adopted a method where the opposite end portions of the cylindrical film are heated to at least more than the softening temperature so that the opposite end faces of the oil holder are covered with the opposite end portions of the cylinder film and then the entire cylindrical film is heated so that it can be mounted closely on the outer periphery of the oil holder.

The above and other objects and advantages of the present invention will become apparent from the following detailed description when read in conjunction with the accompanying drawings.

DETAILED DESCRIPTION OF THE PREFERRED EMBODIMENT

Figure 1:
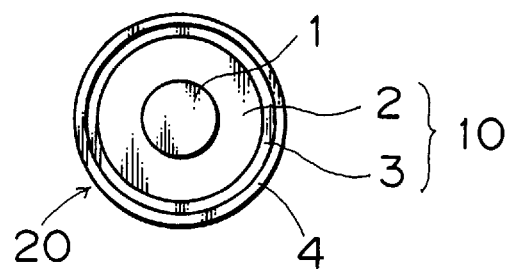
FIG. 1 is a cross sectional view showing the structure of an oil application roll of an embodiment of the present invention.
Figure 2:
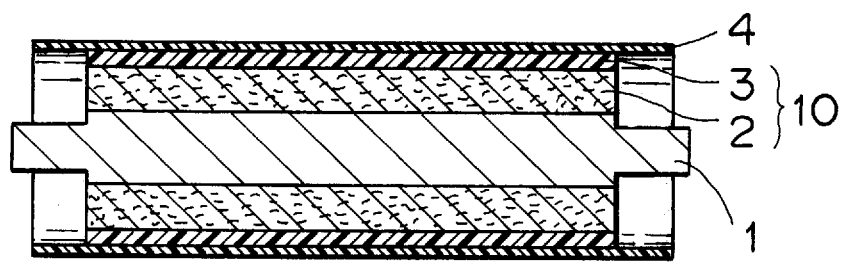
FIG. 2 is a longitudinal sectional view showing a cylindrical film layer inserted on a roll body in the step of fabricating the oil application roll of an embodiment of the present invention.
Figure 3:
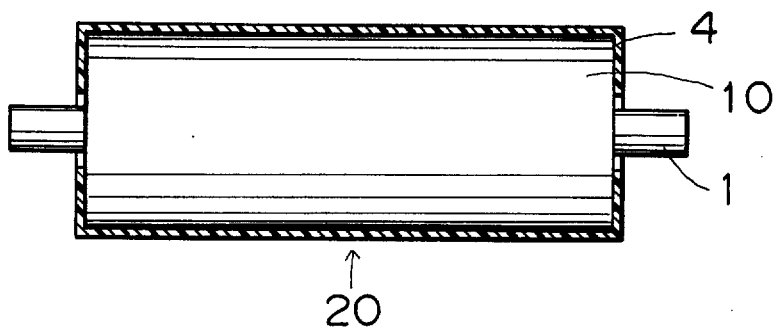
FIG. 3 is a partly sectional view showing the cylindrical film layer fixed on the roll body of an embodiment of the present invention.

Referring now to FIGS. 1 through 3, there is shown a preferred embodiment of an oil application roll 20 in accordance with the present invention. The oil application roll 20 is constituted by a roll base 1, an oil holder 10 including at least either an oil holding layer 2 which consists of nonwoven fabric or nonwoven paper impregnated with oil or an elastic oil holding layer 3 which consists of synthetic leather or porous resin containing oil, and a surface layer 4 consisting of porous fluororesin.

It is preferable that the surface layer 4 be formed from a porous film consisting of fluororesin such as polytetrafluoroethylene. It is also necessary that the maximum pore diameter is 0.1 $\mu$m or less, the air permeability is within a range of 500 to 6000 s/100 cc and the surface roughness is at or less than Ra 0.5 $\mu$m. Furthermore, it is preferable that the thickness be at or greater than 0.05 mm. If the maximum pore diameter exceeds 0.1 $\mu$m or if the surface roughness exceeds Ra 0.5 $\mu$m, the serviceable life will then become shorter due to an occurrence of blinding or image fouling caused by toner. Also, if the air permeability assumes a value smaller than 500 s/100 cc, the operation of a fixing device will be hindered. If, on the other hand, the air permeability assumes a value larger than 6000 s/100 cc, an offset phenomenon will easily come to occur. In addition, the advantages of the present invention will be diminished.

To fabricate the oil application roll 20 of the present invention such as this, it is preferable that the following procedure be performed. First, nonwoven fabric or nonwoven paper is wound around the roll base 1 to form the oil holding layer 2 by a known method. Then, an oil-transmission suppressing sheet, such as synthetic leather or porous resin, is wound around the oil holding layer 2 to form the elastic oil holding layer 3. Thereafter, the roll body where the oil holder 10 was formed in this way is formed into an oil impregnated roll body having a predetermined amount of oil by immersing it, for example, into a parting oil such as silicon oil.

Next, a cylindrical film, which consists of porous fluororesin having a maximum pore diameter of 0.1 $\mu$m or less, a void ratio of 25 to 50%, an air permeability of 500 to 4000 s/100 cc, a surface roughness of Ra 0.5 $\mu$m or less, and a thermal shrinkage factor of more than 30%, is inserted onto the aforementioned oil impregnated roll body. The cylindrical film consisting of such porous fluororesin can be fabricated, for example, by a method described in Japanese Patent Publication No. HEI 5-33650. Important here is that a tube complying with the aforementioned nature is selected and employed from among the fluororesin tubes fabricated by the method. Particularly, if the thermal shrinkage factor is not more than 30%, there will be the possibility that the adhesion of the surface layer to the aforementioned roll body will not be sufficient, and consequently an oil application roll with high reliability will not be obtainable.

For the roll body on which a cylindrical film such as this was mounted, the opposite end portions are first heated to at least more than the softening temperature of the fluororesin, and then only the opposite end portions of the cylindrical film are shrunk more than 30%. In this way, the opposite end faces of the oil holder 10 are covered with the opposite end portions of the cylindrical film, as shown in FIG. 3. Next, by heating the entire roll body and shrinking the entire cylindrical film, a porous fluororesin surface layer is formed over the entire peripheral surface of the oil holder 10. If done in this way, the fluororesin surface layer portion on the peripheral surface will have a maximum pore diameter of 0.1 $\mu$m or less, an air permeability within a range of 500 to 6000 s/100 cc, and a surface roughness of Ra 0.5 $\mu$m or less. As a consequence, there is obtained an oil application roll for electrophotograph fixation of the present invention where there is no image fouling due to toner adhesion and which is long in life and high in reliability. Note that for the aforementioned surface layer portion of the oil application roll for electrophotograph fixation of the present invention, usually the 60° mirror gloss is 30% or more and the thickness is 0.05 mm or more.

(Reference Example)

A roll body of outer diameter 24 mm with the oil holder 10 was made by winding rock wool paper many times around the outer periphery of the aluminum roll base 1 of outer diameter 12 mm and length 310 mm so that the thickness reaches 5 mm and furthermore by spirally winding a leather-like sheet of thickness 1 mm consisting of extra fine aromatic polyester fibers. Next, this roll body was immersed and left alone for 48 hours into silicon oil of viscosity 3000 cSt which serves as a parting oil, and an oil impregnated roll body with an oil holder containing 60 g of silicon oil was obtained.

(Embodiment A)

Fine polytetrafluoroethylene fibers were sintered and extruded by an ordinary past extrusion tube formation method, and a resin tube of outer diameter 7.4 mm and inner diameter 6.7 mm was obtained. Then, this resin tube was inserted into a mirror-polished cylindrical metal mold of inner diameter 27 mm and was heated up to 280° C. Thereafter, an air pressure of 3 kg/cm$^2$ was applied into the resin tube and the length was expanded up to 150%. Next, the nature of the cylindrical film (a), cooled and taken out, were investigated according to a test method of Table 1 to be described later. As a consequence, the cylindrical film (a) had the nature that the maximum pore diameter is less than 0.07 $\mu$m, the void ratio is 45%, the air permeability is 800 s/100 c, the surface roughness is Ra 0.2 $\mu$m, and the thickness is 0.09 mm, and also had a thermal shrinkage of more than 30%.

Next, the aforementioned cylindrical film was inserted on the oil impregnated roll body obtained in the reference example, a hot air of about 300° C. was blown against the opposite end portions of the cylindrical film protruded from the roll body, and the cylindrical film end portions was shrunk so as to be fixed on the end faces of the roll body. Thereafter, this was kept in a constant-temperature bath of 150° C. for 1 hour, and an oil application roll (A) of the present invention with the surface layer 4 attached closely to the entire outer peripheral surface of the roll body was obtained.

Next, there was employed a test copying machine, which is equipped with a fixing roll of outer diameter 40 mm which has a covering layer of polytetrafluoroethylene on its surface and a pressure applying roll where a PFA (Tetrafluoroethylene-Perfluoroalkyl-vinylether Copolymer) tube is mounted on a silicon rubber layer of outer diameter 40 mm and thickness 5 mm. In the test copying machine, the aforementioned oil application roll (A) was attached so that it makes contact with the outer periphery of the fixing roll with a load of 200 gf applied to each bearing and is driven by the fixing roll. Then, a copying test was made at a fixing temperature of 185° C. with continuous paper feed mode having a copying speed of 55 sheets/min, using a line chart with an image ratio of 30% as a manuscript and employing sheets of A-4 plain paper of 64 g/m$^2$. Thereafter, the surface fouling of the oil application roll and the change in the quantity of oil application were investigated. It has been found that even if the number of copies exceeds 50000 sheets, there is no surface fouling of the roll and the oil application quantity is also stable.

On the other hand, the surface layer of the oil application roll (A) was cut off and the nature, that is, the maximum pore diameter ($\mu$m), the air permeability (s/100 cc), the surface roughness (Ra, $\mu$m), the thickness (mm), and the gloss (%) were measured according to the test method of Table 1 to be described later. The measurement results and the aforementioned copying test results are shown in Table 2, together with the nature of the cylindrical film (a).

TABLE 1

| | |
|---|---|
| Maximum diameter ($\mu$m) | Measured by a Coulter Porometer. (Manufactured by Coulter Electronics U.K.). |
| Air permeability (Gurley's No., s/100 cc) | Measured by a B-type Gurley's Densometer. (Made by Tester Sangyo K.K.) |
| Void ratio (%) | Calculated by the following equation with measurement of specific gravity. Void ratio = $(d_1 - d_2)/d_1 \times 100$ where $d_1$ is the specific gravity of the resin tube before expansion and $d_2$ is the specific gravity of the resin tube after expansion. |
| Surface roughness (Ra, $\mu$m) | Measured by a surface texture measuring instrument tracing driver, SURFCOM 470A. (Made by Tokyo Seimitsu Co.). |
| Gloss (%) | Measured by a mirror reflection of 60° with a digital deformation gloss meter. (Made by Suga Testing Machine Co.) |
| Thickness (mm) | Measured by a Screw Micrometer. |

(Embodiments B and C and comparison examples D and E)

With the same sintered and extruded resin (polytetrafluoroethylene) tube as that made in the embodiment A, cylindrical polytetrafluoroethylene films (b) through (e) were made in a similar method as the embodiment A, except that the respective expansion conditions are slight different from one another. Then, in combination with the oil impregnated roll bodies made in the reference example, oil application rolls B through E were made according to the same method as the embodiment A, and for these oil application rolls B through E, the nature of the surface layers were investigated. Thereafter, the copying test was made in exactly the similar conditions as the embodiment A. The results are shown in Table 2, together with the nature of the respective cylindrical films and the nature of the surface layers of the oil application rolls.

(Comparison Example F)

With the same sintered and extruded resin (polytetrafluoroethylene) tube as that made in the embodiment A, a cylindrical film (f) was made in a similar method as the embodiment A, except that there was used a cylindrical metal mold which differs only in that the inner surface is a frosted surface. The cylindrical film (f) is different from the cylindrical film (a) only in that the surface roughness is Ra 0.5 $\mu$m. Then, in combination with the oil impregnated roll body made in the reference example, an oil application roll F was made according to exactly the same method as the embodiment A, and the nature of the surface layer was investigated. Thereafter, the copying test was made in exactly similar conditions as the embodiment A. The results are shown in Table 2, together with the nature of the cylindrical film and the nature of the surface layer of the oil application roll.

(Comparison Example G)

A sintered and extruded resin (polytetrafluoroethylene) tube of outer diameter 19.0 mm and inner diameter 18.7 mm was made in a similar method as the embodiment A. Then, by expanding this up to 200% in a similar method as the embodiment A, a cylindrical film (g) was made. The cylindrical film (g) has nearly similar nature as that of the cylindrical film (a), except that the thermal shrinkage in the circumferential direction was about 20%. Then, in combination with this cylindrical film (g) and the oil impregnated roll body made in the reference example, an oil application roll G was made according to the same procedure as the embodiment A, and the nature of the surface layer were investigated. Thereafter, the copying test was made in exactly similar conditions as the embodiment A. There are cases where wrinkles and offset occur in the surface layer, and reproducible test results were not obtained.

(Comparison Example H)

In accordance with the description of an embodiment of Japan Laid-Open Patent Publication No. HEI 4-139477, a burned porous polytetrafluoroethylene film (h) was wound around the peripheral surface of the oil impregnated roll body made in the reference example and was fixed by a thermosetting adhesive. In this way, an oil application roll H was made. The film (h) has a maximum pore diameter of 0.3 $\mu$m, a void ratio of 70%, an air permeability of 100 s/100 cc, a surface roughness of Ra 0.8 $\mu$m, and a thickness of 0.03 mm. Then, the copying test was performed under exactly similar conditions as the embodiment A. As a consequence, it has been found that toner adhesion occurs from the beginning, that image fouling becomes conspicuous about the time when the number of copies exceeds 3000 sheets, and that the oil application quantity is suitable at the beginning but is gradually reduced.

As has been described above, the oil application roll for a fixation device of the present invention can smoothly supply a suitable oil quantity over a long period of time without giving rise to toner blinding, while it is provided with both durability and metal-mold separation ability by the fluororesin surface layer. Moreover, the oil application roll of the present invention has the advantage that image fouling which is caused due to toner adhesion is difficult to occur and that an offset phenomenon can be effectively prevented.

While the invention has been described with reference to a preferred embodiment thereof, it is to be understood that modifications or variations may be easily made without departing from the scope of this invention which is defined by the appended claims.

TABLE 2

| Test number | A | B | C | D | E | F | G | H |
|---|---|---|---|---|---|---|---|---|
| Cylindrical film | a | b | b | d | e | f | g | h |
| Maximum pore diameter | 0.07> | 0.07> | 0.07> | 0.07> | 0.1 | 0.07> | 0.07> | 0.3 |
| Void ratio | 45 | 35 | 25 | 19 | 62 | 45 | 45 | 70 |
| Air permeability | 800 | 1500 | 3000 | 6200 | 400 | 800 | 800 | 100 |

TABLE 2-continued

| | | | | | | | | |
|---|---|---|---|---|---|---|---|---|
| Surface roughness | 0.2 | 0.2 | 0.2 | 0.2 | 0.2 | 0.5 | 0.2 | 0.8 |
| Thickness | 0.09 | 0.09 | 0.09 | 0.09 | 0.09 | 0.09 | 0.09 | 0.03 |
| Surface layer Shrinkage percentage | >30% | >30% | >30% | >30% | >30% | >30% | =20% | 0% |
| Maximum pore diameter | 0.07> | 0.07> | 0.07> | 0.07> | 0.1 | 0.07> | 0.07> | 0.3 |
| Air permeability | 900 | 1650 | 3200 | 6500 | 450 | 900 | 900 | 100 |
| Surface roughness | 0.2 | 0.2 | 0.2 | 0.2 | 0.2 | 0.5 | 0.2 | 0.20 |
| Light glow | 40 | 40 | 38 | 35 | 30 | 20 | 40 | 10 |
| Thickness | 0.1 | 0.1 | 0.1 | 0.1 | 0.1 | 0.1 | 0.1 | 0.03 |
| Oil application | ⊚ | ⊚ | ○ | Δ | Δ | Δ | — | Δ |
| Toner application | ⊚ | ⊚ | ○ | Δ | ○ | Δ | — | Δ |
| Synthetic evaluation | Satisfactory even at more than 5000 sheets | Satisfactory even at more than 5000 sheets | Small quantity of fouling at 5000 sheets | Image fouling at the beginning and gradual increase | Slip at the beginning | Fouling at 3000 sheets by toner adhesion | Offset and wrinkles | Toner adhesion at the beginning and image fouling at 3000 sheets |

What is claimed is:

1. An oil application roll for electrophotograph fixation, comprising:

a roll base;

an oil holder provided on said roll base; and a porous fluororesin surface layer provided on said oil holder, wherein said porous fluororesin surface layer has a maximum pore diameter of 0.1 μm or less, an air permeability of 500 to 6000 s/100 cc, and a surface roughness of Ra 0.5 μm or less for ensuring to supply a suitable oil quantity over a long period of time without toner blinding and for realizing a long serviceable life without image fouling due to toner adhesion.

2. The oil application roll for electrophotograph fixation as set forth in claim 1, wherein said porous fluororesin surface layer has a thickness of 0.05 mm or more.

3. The oil application roll for electrophotograph fixation as set forth in claim 2, wherein said porous fluororesin surface layer is composed of polytetrafluoroethylene.

4. The oil application roll for electrophotograph fixation as set forth in claim 1, wherein said porous fluororesin surface layer is composed of polytetrafluoroethylene.

5. A method of fabricating an oil application roll for electrophotograph fixation, comprising the steps of:

providing an oil holder on a roll base;

mounting a cylindrical film consisting of porous fluororesin having a thermal shrinkage of more than 30% onto said oil holder to obtain a roll body; and heating said roll body so that said oil holder is covered with said cylindrical film, wherein said cylindrical film consisting of porous fluororesin has a maximum pore diameter of 0.1 μm or less, a void ratio of between 25% and 70%, an air permeability of between 500 s/100 cc and 6000 s/100 cc, and a surface roughness of Ra 0.5 μm or less.

6. A method of fabricating an oil application roll for electrophotograph fixation as set forth in claim 5, wherein said void ratio is between 25% and 50%, and said air permeability is between 800 s/100 cc and 4000 s/100 cc.

* * * * *